INVENTOR
RICHARD E. LANG 3,166,952
DRIVE SYSTEMS
Richard E. Lang, Lincoln, Mass., assignor, by mesne assignments, to the United States of America as represented by the Secretary of the Navy
Filed Oct. 19, 1961, Ser. No. 146,385
1 Claim. (Cl. 74—665)

The present invention relates to drive systems, and more specifically to hydraulic or electric systems employing gear trains.

The conventional practice in drive systems has been the use of a single motor geared to a load. Alternatively, several motors have also been employed in parallel or series aiding relationship.

While in the past both the advantages and the disadvantages of utilizing hydraulic power drives employing gear trains have been numerous, they have been widely accepted for use on both commercial and military systems. Gear mesh clearance has always, however, been a source of inherent limitation since it relates directly to wear caused by backlash, mesh interference, and to costly manufacture. The deleterious features resulting from gear mesh clearance arise in the gearing portion of the drive rather than in the hydraulic portion and exist in both instrument and power gearing.

Instrument gearing, by definition, is a lightly loaded gear train when employed in precision systems. Such a gear train is frequently manufactured with adjustable center to center distances so that clearance and backlash may be maintained at an acceptable minimum over the natural life of the gears. Thus, since the loads are light, periodic adjustment may be infrequent and an acceptable feature.

Power gearing, on the other hand, is usually a compromise of several considerations. First, the short term performance dictates absolute minimum clearance or backlash. Second, the long term performance requires at least a minimum clearance to insure smooth non-interfering mesh and adequate lubrication. Third, a transmission of power increases the difficulty of designing center to center adjustment which will not shift when sudden loads are applied or when the system is subject to shock and vibration environments. Fourth, in place of center to center adjustment, extreme tolerances are usually placed on the manufacture of system components thus resulting in costly equipment. Finally, since he performance of the system degenerates with use, the power gearing or at least a portion thereof must be eventually replaced. Replacing but a portion of the power gearing is difficult since it requires selective matching of the parts.

The invention pertains to a drive system employing gearing wherein motors are connected in an opposing torque relationship. For the purposes of this application the term "opposing torque" is defined as a relationship of two motors or groups of motors wherein the output force of one of the motors or groups of motors tends to oppose the output driving force of the other motor or groups of motors. This arrangement is applicable in principle to either an electric or a hydraulic drive. The novel opposing torque motor arrangement provides a backlash free gear train while maintaining gear mesh clearance, thus insuring a smooth non-interfering mesh. This invention embraces the advantages of the prior drive systems and possesses none of the aforedescribed disadvantages.

An object of the present invention is the provision of a drive system employing gearing which eliminates back-lash.

Another object is to provide a drive system for gearing which has sufficient gear mesh clearance.

A further object of the invention is the provision of an opposing torque drive system wherein the gearing has a smooth non-interfering mesh.

Still another object is to provide a drive system employing gearing wherein high tolerances during the manufacture are not necessary, thus avoiding use of costly equipment.

Yet another object of the present invention is the provision of a hydaulic drive system wherein the operating life of the component parts is increased.

Other objects and many of the attendant advantages of this invention will be readily appreciated as the same becomes better understood by reference to the followng detailed description when considered in connection with the accompanying drawings wherein.

Figure 1:
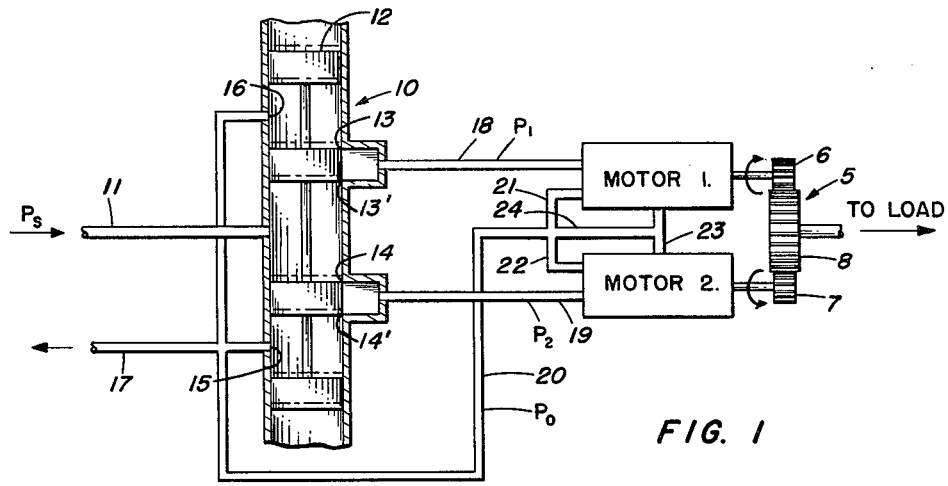
FIG. 1 shows a plan view, partly in section, of a preferred embodiment of the invention.

Referring now to the drawings, wherein like reference characters designate like or corresponding parts throughout the several views, there is shown in FIG. 1 drive motors 1 and 2 in opposing torque relationship. The motors 1 and 2 drive the gearing generally shown at 5 by their respective motor or drive gears 6 and 7. The driven or load gear 8, which is connected to a load, is in turn driven by the drive gears 6 and 7. Motors 1 and 2 are driven by a hydraulic supply system which includes a servo valve 10 for controlling the flow and the pressures of the hydraulic fluid.

Hydraulic fluid of pressure $P_s$ and flow $Q_s$ is supplied to the servo valve 10 through a hydraulic fluid line 11. The servo valve 10 has a valve spool 12 and orifices 13, 13', 14 and 14'. The orifices 13 and 13' and 14 and 14' are connected to motors 1 and 2, respectively, through fluid lines 18 and 19. The servo valve 10 also has outlets 15 and 16 which are connected to the return flow line 17. The valve spool 12 operates to control the pressure and hydraulic fluid flow through the orifices and outlets. Thus, as the valve spool 12 is adjusted to one side or the other of the central position shown in FIG. 1 by the solid line, the fluid pressure $P_1$ and the fluid flow $Q_1$ as well as fluid pressure $P_2$ and $Q_2$ of the hydraulic fluid lines 18 and 19, respectively, will be controlled. If the valve spool is in a position indicated by the broken lines the hydraulic fluid supplied will flow into line 18 and be blocked from flowing into line 19. However, the return of the fluid will be achieved through fluid line 19. The low pressure fluid line 20 is commonly connected to the case drain 23 of motors 1 and 2. In this embodiment line 20 is also connected to motors 1 and 2 through lines 21 and 22 to insure that the pressure drop across each motor is unidirectional regardless of fluid flow direction.

For a more complete understanding of the operation of the embodiment of FIG. 1, consider motor 1 to be supplied with a fluid flow $Q_1$ and with a pressure drop $\Delta P_{M1}$, and similarly, consider motor 2 to be supplied with a flow $Q_2$ with a pressure drop $\Delta P_{M2}$. Pressure drops are defined as $P_a - P_b$ when flow goes from "$a$" to "$b$."

The torque $T_{M1}$ and the speed $W_{M1}$ of hydraulic motor 1 will be $$T_{M1} = N_{T1} V_{M1} (P_1 - P_0) \qquad (1)$$
$$W_{M1} = N_{Q1} Q_1 / V_{M1} \qquad (2)$$

In (1) and (2) above the torque flow efficiencies are given as $N_{T1}$ and $N_{Q1}$. $V_{M1}$ is the motor displacement and $P_1$ and $P_0$ are the pressures in lines 18 and 20, respectively. Similarly, in motor 2 the torque $T_{M2}$ and speed $W_{M2}$ of motor 2 will be $$T_{M2} = N_{T2} V_{M2} (P_0 - P_2) \qquad (3)$$
$$W_{M2} = N_{Q1} Q_1 / V_{M2} \qquad (4)$$

In (3) and (4) above the torque and flow efficiencies are given as $N_{T2}$ and $N_{Q2}$. $V_{M2}$ is the motor displacement, and $P_0$ and $P_2$ are the pressures in the fluid lines 20 and 19, respectively. Thus, the net torque $T_L$ delivered to the load will be:

$$N_{T1}=N_{T2}$$
$$N_{Q1}=M_{Q2} \quad (6)$$
$$V_{M1}=V_{M2}$$

Thus, $$T_L=N_T V_M[(P_1-P_0)+(P_0-P_2)]=N_T V_M(P_1-P_2) \quad (7)$$

the net torque $T_L$ delivered by the two motors is, therefore, a function of $P_1$ and $P_2$ and independent of the intermediate pressure $P_0$.

Figure 3:
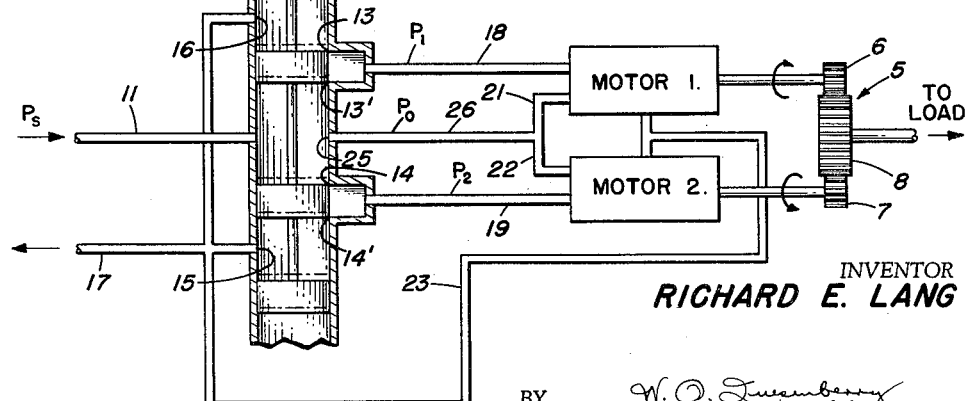
FIG. 3 shows a plan view, partly in section, of a modification of the invention.

The embodiment set forth in FIG. 3 is highly similar to that set forth in FIG. 1. In FIG. 3 the hydraulic fluid entering the servo valve 10 through the hydraulic fluid supply line 11 also flows through the servo valve to the fluid line 26, which is commonly joined to motor 1 and motor 2. The normal fluid flow through line 26 is that amount which supplies leakage flow to both motors and any make-up required for dissimilarities between motors. The case drain 23 for motors 1 and 2 is connected to the return flow line 17 by means of line 23.

Since the fluid flow through fluid line 26 in FIG. 3 is maintained at a lesser amount than the fluid flow in fluid lines 18 and 19, the main fluid flow through the motors in FIG. 3 will be through lines 18, 21, 22 and 19. Therefore, Equations 1 to 7 supra apply equally to the hydraulic system of FIG. 3 and the net torque delivered by the two motors is a function of $P_1$ and $P_2$ and independent of the pressure $P_0$ in line 26.

The effect of the intermediate pressure $P_0$ is clarified by considering the possible pressure relationship of $P_1$, $P_2$, and $P_0$. These possible pressure relationships are:

$$P_1>P_0>P_2 \quad (8)$$
$$P_0=P_1 \text{ or } P_2 \quad (9)$$
$$P_0<\text{both } P_1 \text{ and } P_2 \quad (10)$$
$$P_0>\text{both } P_1 \text{ and } P_2 \quad (11)$$

Figure 2:
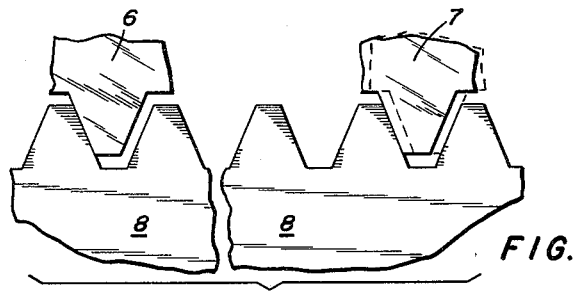
FIG. 2 illustrates the gear teeth relationship of the gear train of the invention.

The pressure relationships (10) and (11) will always cause the mesh to be in the same direction for each motor. That is, the motors will bias their drive gears against opposite faces of the teeth of the driven or load gear. This is illustrated in FIG. 2 wherein drive gear 6 is biased against an opposite face of a tooth of the driven or load gear than is the drive or motor gear 7 as shown by dotted lines. That the mesh in pressure relationships (10) and (11) will always be in the same direction for each motor is evident since $P_1-P_0$ and $P_2-P_0$ are either always positive [relationship (10)] or always negative [relationship (11)] with only the magnitude susceptible to change. Pressure relationships (8) and (9), however, will either cause the motors to be in series aiding relationship (as seen in solid in FIG. 2) rather than opposing torque or will cause the mesh of one of the drive gears and the driven gear to be floating and indeterminant. Therefore, since the change in the sign of the load torque is accompanied by a corresponding change in the direction of the mesh both pressure relationships (8) and (9) will allow gear mesh clearance subjecting the gearing to backlash.

The intermediate pressure $P_0$ performs three useful functions. First, it maintains unidirectional pressure drop across each motor which in turn maintains a unidirectional mesh in the entire gearing. Secondly, no two motors will be either ideal or identical and some source of make-up fluid is desirable. Third, a finite $P_0$ insures against cavitation.

The operation of the hydraulic opposing torque drive system in the embodiment of FIG. 1 operates in two different manners. This operation is determined by the position of the valve spool 12 which determines the various pressures and hydraulic flows. The hydraulic fluid is applied to the servo valve 10 through a supply line 11. The valve spool 12 has two operative positions. The first when the valve spool 12 is displaced from its center position as indicated in FIG. 1 by the broken lines and orifice 13' is opened to complete a path for the incoming hydraulic fluid. At the same time orifice 14 is closed to the incoming hydraulic fluid but 14' opens so as to create a return flow path from motor 2. When the valve spool is centered as shown in solid in FIG. 1 there is no net power delivered to the load and, therefore, no operation of the drive system. The second operative position is the displacement of the valve spool from its center position an amount equal but opposite to the first operative position. In this position the orifice 13' is closed to the incoming hydraulic fluid from motor 1. By the same token orifice 14 is opened to the incoming hydraulic fluid from line 11. Thus, the operation of the hydraulic opposing torque system can be reversed by adjusting the valve spool's position from one operative position to the other.

When the valve spool is positioned in the position indicated by the dashed lines in FIG. 1 the fluid flow into the hydraulic line 18 through orifice 13' causes an increase in pressure $P_1$ and flow $Q_1$ in that line. Since orifice 14' is opened as a return flow for the hydraulic fluid the flow through hydraulic fluid line 19 increases while the pressure decreases. Since this embodiment is instrumented according to pressure relationship (10) above, $P_0$ is less than either $P_1$ or $P_2$. Also, since the valve spool is in the position indicated by the dashed lines, the pressure $P_1$ in line 18 is larger than $P_2$ in line 19. Since the pressure $P_0$ in line 20 is less than the pressure $P_2$ in line 19, motor 1 will drive motor 2. Thus both motors will tend to exert torque in opposite directions at all times. By doing so each motor always loads its own portion of the gear train in the same direction regardless of whether it is delivering power or absorbing power. This embodiment then will bias its teeth of the drive gears of motors 1 and 2 against opposite faces of the teeth on the load gear 8 in the manner shown by the solid portion 6 and by the dashed line portion 7 in FIG. 2. Since the hydraulic fluid flow through hydraulic line 18 will tend to drive motor 1 and since fluid line 20 has a lower pressure than fluid line 19 the hydraulic fluid flow from motor 1 will tend to flow principally into the hydraulic fluid line 20. Therefore, motor 1 will provide a greater torque than will motor 2. Motor 1 will provide the source of delivering power and motor 2 will be absorbing power. If the valve spool 12 is displaced from its center position an amount equal but opposite to the amount displaced as indicated by the broken lines in FIG. 1, it is understood that the operation of the system described will occur in the reverse.

The embodiment of FIG. 3 is instrumented according to pressure relationship (11) wherein the pressure $P_0$ is greater than both $P_1$ and $P_2$. When the valve spool is positioned in the position indicated by the dashed lines in FIG. 3 the fluid flow into the hydraulic line 18 through orifice 13' causes an increase in pressure $P_1$ and flow $Q_1$, in that line. Since orifice 14' is opened as a return flow for the hydraulic fluid the flow through hydraulic fluid line 19 increases while the pressure decreases. Due to the fact that the fluid flow through fluid line 26 is maintained at an amount significantly less than the fluid flow through fluid lines 18 and 19 the flow through the motor system will be from motor 1 to motor 2 via fluid lines 21 and 22. In this manner both motors will tend to exert torque in opposite directions at all times. The motors 1 and 2 will then bias their drive gear teeth against opposite faces of the teeth on the load gear 8. If the valve spool 12 is displaced from its center position an amount equal but opposite to the amount displaced as indicated by the broken lines in FIG. 1, it is understood that the operation of the system described will occur in the reverse.

The embodiment in FIG. 1 which is instrumented according to pressure relationship (10) is somewhat superior to the embodiment of FIG. 3 which is instrumented according to pressure relationship (11). An advantage is that the average pressure in the motors employed in FIG. 1 is smaller. An additional advantage of FIG. 1 is that the common pressure line between the two motors is low pressure. Thus, the resultant net thrust on the internal components of the motor is less by a factor of three than it would be had the system been instrumented according to pressure relationship (11) as illustrated in FIG. 3. Since the life of hydraulic systems is approximately proportional to the inverse cube of the net thrust on the motor parts, the motor in embodiment of FIG. 1 represents the system which would have approximately twenty-seven times the normal life that the same motor would have if instrumented according to pressure relationship (11) as illustrated in FIG. 3. It would also have approximately eight times the normal life that the same motor would have in the conventional drive using a single motor (say motor 1) wherein line 21 would be connected directly to line 19.

The concept of this invention is applicable in principle to either an electric drive system or a hydraulic system. Since torque is proportional to pressure drop or current, and speed is proportional to flow or voltage drop, the concept of the present invention could well be instrumented with either an electric opposing torque drive system or a hydraulic opposing torque drive system.

Various modifications are contemplated and may obviously be resorted to by those skilled in the art without departing from the spirit and scope of the invention as hereinafter defined by the appended claim as preferred embodiments thereof have been disclosed.

What is claimed and desired to be secured by Letters Patent of the United States is:

A drive system for gearing comprising a pair of hydraulically driven motors in opposing torque relationship; a drive gear connected to each motor; a driven gear connected to a load and meshed with both of the drive gears; a hydraulic power supply for said motors, means controlling the admission of the hydraulic fluid to either of said motors and controlling the discharge of said fluid from said motors, whereby one of said motors drives the driven gear in one direction while the other of said motors resists the turning of said driven gear to the extent of maintaining a torque relationship in opposite directions on said driven gear, while permitting rotation of the driven gear in a selected direction.

References Cited by the Examiner
UNITED STATES PATENTS

| | | |
|---|---|---|
| 1,783,209 | 12/30 | Wilsey. |
| 2,902,875 | 9/59 | Finally et al. _____ 74—409 |
| 2,911,843 | 11/59 | Mitchell. |

DON A. WAITE, *Primary Examiner.*